United States Patent
Li et al.

(10) Patent No.: US 9,521,467 B2
(45) Date of Patent: Dec. 13, 2016

(54) METHOD AND APPARATUS FOR PROGRAM INFORMATION EXCHANGE AND COMMUNICATIONS SYSTEM USING A PROGRAM COMMENT INSTRUCTION

(71) Applicant: Huawei Device Co., Ltd., Shenzhen (CN)

(72) Inventors: Lei Li, Shenzhen (CN); Zheng Yu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 169 days.

(21) Appl. No.: 14/484,795

(22) Filed: Sep. 12, 2014

(65) Prior Publication Data

US 2014/0380344 A1   Dec. 25, 2014

Related U.S. Application Data

(63) Continuation of application No. PCT/CN2013/072432, filed on Mar. 12, 2013.

(30) Foreign Application Priority Data

Mar. 12, 2012 (CN) .......................... 2012 1 0063558

(51) Int. Cl.
*H04N 21/658* (2011.01)
*H04N 21/258* (2011.01)
(Continued)

(52) U.S. Cl.
CPC ...... *H04N 21/6582* (2013.01); *H04N 21/2347* (2013.01); *H04N 21/258* (2013.01);
(Continued)

(58) Field of Classification Search
CPC ................... H04N 21/6582; H04N 21/25816; H04N 21/4405; H04N 21/43853; H04N 21/2347; H04N 21/44213; H04N 21/44204; H04N 21/258
(Continued)

(56) References Cited

U.S. PATENT DOCUMENTS

2004/0073947 A1   4/2004   Gupta
2008/0168506 A1   7/2008   Pickelsimer
(Continued)

FOREIGN PATENT DOCUMENTS

CN   1320336 A   10/2001
CN   101106696 A   1/2008
(Continued)

OTHER PUBLICATIONS

Partial English Translation and Abstract of Japanese Patent Application No. JP2004040698, Nov. 30, 2015, 23 pages.
(Continued)

*Primary Examiner* — Hoang-Vu A Nguyen-Ba
(74) *Attorney, Agent, or Firm* — Conley Rose, P.C.

(57) ABSTRACT

Relating to the field of communications, a method and an apparatus for program information exchange and a communications system provided in embodiments of the present invention can enable a user to, by using a user equipment, make a comment on a program currently being watched without adding an external input device. The method for program information exchange in the embodiment includes: obtaining a program comment instruction; extracting information about a current program from a pre-established database according to the program comment instruction; sending, if the information includes a program comment address, the program comment address to a user equipment.

20 Claims, 4 Drawing Sheets

(51) Int. Cl.
*H04N 21/4405* (2011.01)
*H04N 21/4385* (2011.01)
*H04N 21/2347* (2011.01)
*H04N 21/442* (2011.01)

(52) U.S. Cl.
CPC . *H04N 21/25816* (2013.01); *H04N 21/43853* (2013.01); *H04N 21/4405* (2013.01); *H04N 21/44204* (2013.01); *H04N 21/44213* (2013.01)

(58) Field of Classification Search
USPC .... 725/9, 24, 30, 31, 40, 112, 117; 705/758, 705/809; 715/758, 809
See application file for complete search history.

(56) References Cited

U.S. PATENT DOCUMENTS

| | | | | |
|---|---|---|---|---|
| 2009/0164904 | A1* | 6/2009 | Horowitz | G06F 17/30817 715/723 |
| 2010/0100904 | A1* | 4/2010 | Kawakami | H04N 7/17318 725/37 |
| 2010/0199182 | A1* | 8/2010 | Lanza | G06F 17/30817 715/723 |
| 2011/0145880 | A1* | 6/2011 | Wang | H04N 21/254 725/117 |
| 2011/0271303 | A1* | 11/2011 | Isozu | H04N 21/4126 725/40 |
| 2013/0290992 | A1 | 10/2013 | Mckissick et al. | |

FOREIGN PATENT DOCUMENTS

| | | | |
|---|---|---|---|
| CN | 101510995 | A | 8/2009 |
| CN | 101854513 | A | 10/2010 |
| CN | 101998162 | A | 3/2011 |
| CN | 102238420 | A | 11/2011 |
| CN | 102595215 | A | 7/2012 |
| JP | 2004040698 | A | 2/2004 |
| JP | 2007079745 | A | 3/2007 |
| JP | 2010062963 | A | 3/2010 |

OTHER PUBLICATIONS

Partial English Translation and Abstract of Japanese Patent Application No. JP2007079745, Nov. 30, 2015, 128 pages.
Partial English Translation and Abstract of Japanese Patent Application No. JP2010062963, Nov. 30, 2015, 54 pages.
Foreign Communication From a Counterpart Application, Japanese Application No. 2014561276, Japanese Office Action dated Sep. 29, 2015, 3 pages.
Foreign Communication From a Counterpart Application, Japanese Application No. 2014561276, English Translation of Japanese Office Action dated Sep. 29, 2015, 3 pages.
Foreign Communication From a Counterpart Application, European Application No. 1376192.7, Extended European Search Report dated Mar. 18, 2015, 10 pages.
Partial English Translation and Abstract of Chinese Patent Application No. CN101510995A, Dec. 9, 2014, 18 pages.
Partial English Translation and Abstract of Chinese Patent Application No. CN101998162A, Sep. 18, 2014, 8 pages.
Partial English Translation and Abstract of Chinese Patent Application No. CN102595215A, Part 1, Dec. 12, 2014, 6 pages.
Partial English Translation and Abstract of Chinese Patent Application No. CN102595215A, Part 2, Dec. 12, 2014, 3 pages.
Foreign Communication From a Counterpart Application, Chinese Application No. 201210063558.5, Chinese Office Action dated Jul. 29, 2013, 7 pages.
Foreign Communication From a Counterpart Application, PCT Application No. PCT/CN2013/072432, English Translation of International Search Report dated Jun. 20, 2013, 3 pages.
Foreign Communication From a Counterpart Application, PCT Application No. PCT/CN2013/072432, English Translation of Written Opinion dated Jun. 20, 2013, 7 pages.

\* cited by examiner

METHOD AND APPARATUS FOR PROGRAM INFORMATION EXCHANGE AND COMMUNICATIONS SYSTEM USING A PROGRAM COMMENT INSTRUCTION

CROSS-REFERENCE TO RELATED APPLICATIONS

This application is a continuation of International Application No. PCT/CN2013/072432, filed on Mar. 12, 2013, which claims priority to Chinese Patent Application No. 201210063558.5, filed on Mar. 12, 2012, both of which are incorporated herein by reference in their entireties.

TECHNICAL FIELD

The present invention relates to the field of communications, and in particular, to a method and an apparatus for program information exchange and a communications system.

BACKGROUND

In recent years, the Internet and home wireless networks have been very popular. Represented by a mobile phone with a wireless network function, many domestic multimedia products can connect to a home network via a wireless router, and access the Internet. With rapid development and promotion of an Internet Protocol Television (IPTV) technology, an increasing number of people start to use an Internet Protocol television. The Internet Protocol television has a basic function of receiving a digital television program, and meanwhile also has a service for interaction and a comment related to a digital television.

However, currently, an operation of the service for interaction and a comment related to the digital television is very complicated. For example, for the service for interaction and a comment of the Internet Protocol television, a user needs to connect an external keyboard for input or select input by using a remote control. An extra device needs to be added or the input is inconvenient, which restricts development of interaction and exchange of a digital television program, and initiative of a user is not high.

SUMMARY

Embodiments of the present invention provide a method and an apparatus for program information exchange and a communications system, which can enable a user to, by using a user equipment, make a comment on a program currently being watched without adding an external input device.

In order to achieve the above objective, the following technical solution is adopted in the embodiments of the present invention.

According to one aspect, an embodiment of the present invention provides a method for program information exchange, where the method includes: obtaining a program comment instruction; extracting information about a current program from a pre-established database according to the program comment instruction; and sending, if the information includes a program comment address, the program comment address to a user equipment, so that a user acquires a comment on the current program or makes a comment on the current program according to the program comment address; or sending, if the information does not include a program comment address, a server address in the information to a user equipment, so that the user equipment establishes a connection with a server according to the server address, thereby enabling the user to make a comment on the current program by using the user equipment.

According to one aspect, an embodiment of the present invention provides an apparatus for program information exchange, where the apparatus includes a processing module, and an obtaining module and a nekwork module that are respectively connected to the processing module; the obtaining module is configured to obtain a program comment instruction; the processing module is configured to extract information about a current program from a pre-established database according to the program comment instruction, and determine whether the information about the current program includes a program comment address; and the network module is configured to, if the information includes the program comment address, send the program comment address to a user equipment, so that a user acquires a comment on the current program or makes a comment on the current program according to the program comment address, or if the information does not include the program comment address, send a server address in the information to a user equipment, so that the user equipment establishes a connection with a server according to the server address, thereby enabling the user to make a comment on the current program by using the user equipment.

According to one aspect, an embodiment of the present invention provides a communications system, where the system includes: an apparatus for program information exchange configured to, after obtaining a program comment instruction, extract information about a current program from a pre-established database according to the program comment instruction; if the information includes a program comment address, send the program comment address to a user equipment, so that a user acquires a comment on the current program or makes a comment on the current program according to the program comment address; or if the information does not include the program comment address, send a server address in the information to a user equipment, so that the user equipment establishes a connection with a server according to the server address, thereby enabling the user to make a comment on the current program by using the user equipment; the user equipment configured to receive the program comment address from the apparatus for program information exchange, so that the user acquires a comment on the current program or makes a comment on the current program according to the program comment address, or receive the server address from the apparatus for program information exchange, and establish a connection with the server according to the server address, thereby enabling the user to make a comment on the current program by using the user equipment; and the server configured to establish a connection with the user equipment, thereby enabling the user to make a comment on the current program by using the user equipment.

In the method and the apparatus for program information exchange and the communications system provided by the embodiments of the present invention, after a program comment instruction is obtained, information about a current program is extracted from a pre-established database according to the program comment instruction; if the information includes a program comment address, the program comment address is sent to a user equipment, so that a user acquires a comment on the current program or makes a comment on the current program according to the program comment address; or if the information does not include the program comment address, a server address in the information is sent to a user equipment, so that the user equipment establishes a connection with a server according to the server address, thereby enabling the user to make a comment on the current program by using the user equipment. With the solution, the user can make a comment by using the user equipment on the program currently being watched without adding an external input device.

BRIEF DESCRIPTION OF DRAWINGS

To describe the technical solutions in the embodiments of the present invention or in the prior art more clearly, the following briefly introduces accompanying drawings required for describing the embodiments or the prior art. The accompanying drawings in the following description show merely some embodiments of the present invention, and a person of ordinary skill in the art may still derive other drawings according to these accompanying drawings without creative efforts.

DESCRIPTION OF EMBODIMENTS

In the following description, specific details like a specific system structure, an interface, and a technology are mentioned for illustration instead of limitation, to make the present invention understood completely. However, a person skilled in the art should understand that, the present invention may also be implemented in other embodiments without these specific details. In other cases, detailed description of a well-known apparatus, a circuit, and a method are not described, to prevent unnecessary details from hindering the description of the present invention.

A user equipment may be a wireless terminal or a wired terminal. The wireless terminal may refer to an apparatus that provides voice and/or data connectivity to a user, a handheld apparatus with a wireless connection function, or another processing apparatus connected to a wireless modem. The wireless terminal can communicate with one or more core networks by means of a Radio Access Network (RAN). The wireless terminal may be a mobile terminal, like a mobile phone (or referred to as a "cellular" phone) or a computer with a mobile terminal, for example, a portable, pocket, handheld, built-in-computer, or vehicle-mounted mobile apparatus, which exchanges audio and/or data with the radio access network, for example, a Personal Communication Service (PCS) phone, a cordless phone, a session initiation protocol (SIP) phone set, a Wireless Local Loop (WLL) station, or a Personal Digital Assistant (PDA). The wireless terminal may also be referred to as a system, a subscriber unit, a subscriber station, a mobile station, a mobile, a remote station, an access point, a remote terminal, an access terminal, a user terminal, a user agent, a user apparatus, or a user equipment.

Figure 1:
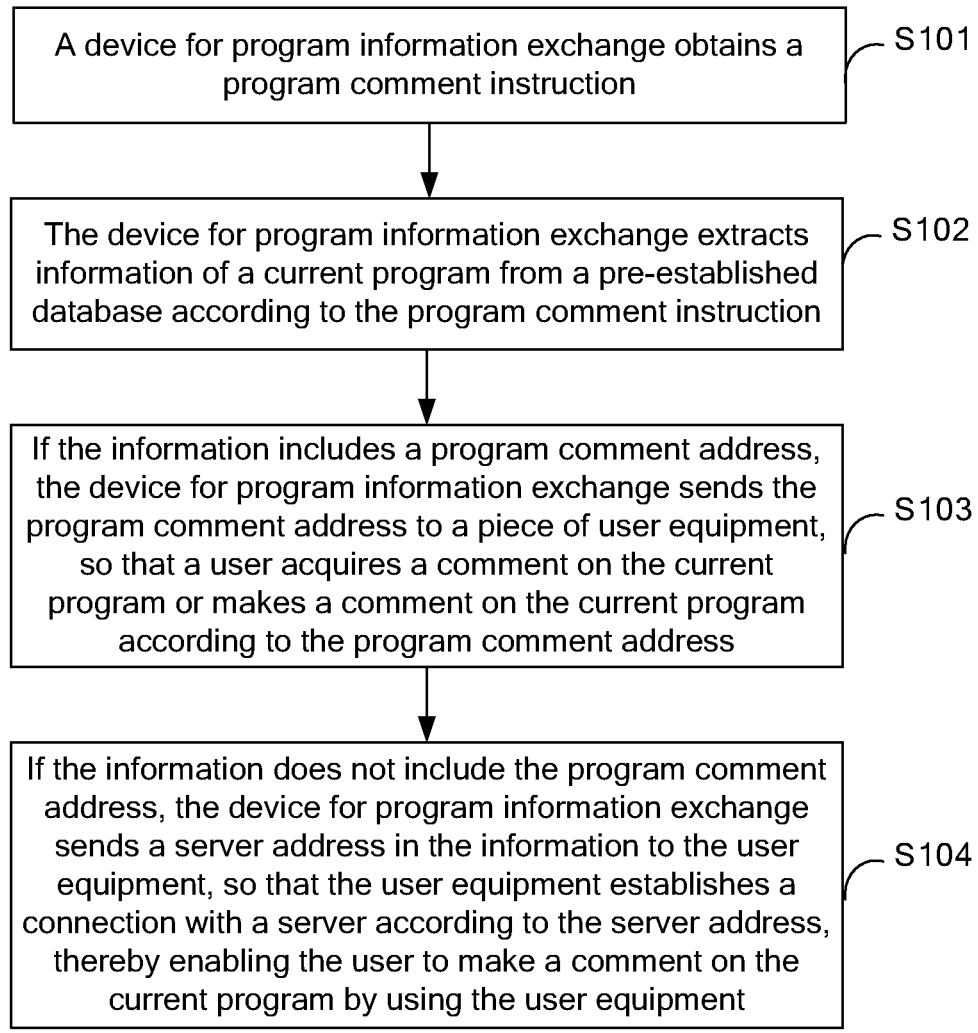
FIG. 1 is a first schematic flowchart of a method for program information exchange according to an embodiment of the present invention.

An embodiment of the present invention provides a method for program information exchange. As shown in FIG. 1, the method includes:

S101: An apparatus for program information exchange obtains a program comment instruction.

Exemplarily, a manner for the apparatus for program information exchange to obtain the program comment instruction may be that, the apparatus for program information exchange receives a program comment instruction which is input by a user by using a control apparatus such as a remote control.

When the user is watching a television program, if the user wants to make a comment on a current program or wants to know what comments are made by others on the current program, the user can input the program comment instruction by using the control apparatus such as a remote control. For example, a program comment button may be set on the remote control, and the user can send the program comment instruction only by pressing the program comment button, so as to trigger the apparatus for program information exchange to extract information about the current program from a pre-established database.

S102: The apparatus for program information exchange extracts information about the current program from a pre-established database according to the program comment instruction.

It is necessary to explain the pre-established database herein. The pre-established database may be stored on a server end, for example, a broadcast television network terminal. The server packages together program audio and video streams and program-related information, such as a program name, an episode, a comment address, and a server address, and broadcasts the package in a wired or wireless manner. The packaging mentioned in the embodiment of the present invention refers to performing data grouping for a compressed file to meet a requirement of signal transmission.

After obtaining the program comment instruction, the apparatus for program information exchange extracts the information about the current program from the pre-established database, where the information may include the program name, episode, comment address, server address, and the like.

S103: If the information includes a program comment address, the apparatus for program information exchange sends the program comment address to a user equipment, so that a user acquires a comment on the current program or makes a comment on the current program according to the program comment address.

After extracting the information about the current program, the apparatus for program information exchange determines whether the information includes the program comment address. If the information includes the program comment address, the apparatus for program information exchange sends the program comment address to the user equipment, for example, sends the program comment address to the user equipment via a wireless router. After receiving the program comment address from the apparatus for program information exchange, the user equipment can connect to a related webpage according to the program comment address. Then, the user using the user equipment may acquire a comment on the current program or make a comment on the current program by using the user equipment.

It should be supplemented that the apparatus for program information exchange does not send the program comment address to all user equipment. The apparatus for program information exchange performs permission verification for the user equipment, and then communicates only with the user equipment that passes permission authentication. For example, the apparatus for program information exchange may perform permission verification once for the apparatus and establish a connection with the user equipment when the apparatus is switched on, and then send the program comment address to the user equipment.

S104: If the information does not include the program comment address, the apparatus for program information exchange sends a server address in the information to a user equipment, so that the user equipment establishes a connection with a server according to the server address, thereby enabling the user to make a comment on the current program by using the user equipment.

After extracting the information about the current program, the apparatus for program information exchange determines whether the information includes the program comment address. If the information does not include the program comment address, the apparatus for program information exchange sends the server address in the information to the user equipment. Similarly, the server address can be sent to the user equipment via the wireless router. After receiving the server address from the apparatus for program information exchange, the user equipment may connect to the server according to the server address, and the server may create a comment community for the program. Then, the user using the user equipment can make a comment on the current program by using the user equipment. Further, the server stores a newly established program comment address in the information about the program, and stores the information in the pre-established database.

It should be noted that in the embodiment of the present invention, step S103 and step S104 may be executed in any sequence. Step S103 describes a case where the information includes a program comment address, and step S104 describes a case where the information does not include a program comment address; therefore, there is no limitation for time sequence.

In the method for program information exchange provided by the embodiment of the present invention, after a program comment instruction is obtained, information about a current program is extracted from a pre-established database according to the program comment instruction; if the information includes a program comment address, the program comment address is sent to a user equipment, so that a user acquires a comment on the current program or makes a comment on the current program according to the program comment address; or if the information does not include a program comment address, a server address in the information is sent to a user equipment, so that the user equipment establishes a connection with a server according to the server address, thereby enabling the user to make a comment on the current program by using the user equipment. With the solution, the user can make a comment by using the user equipment on the program currently being watched without adding an external input device.

Figure 2:
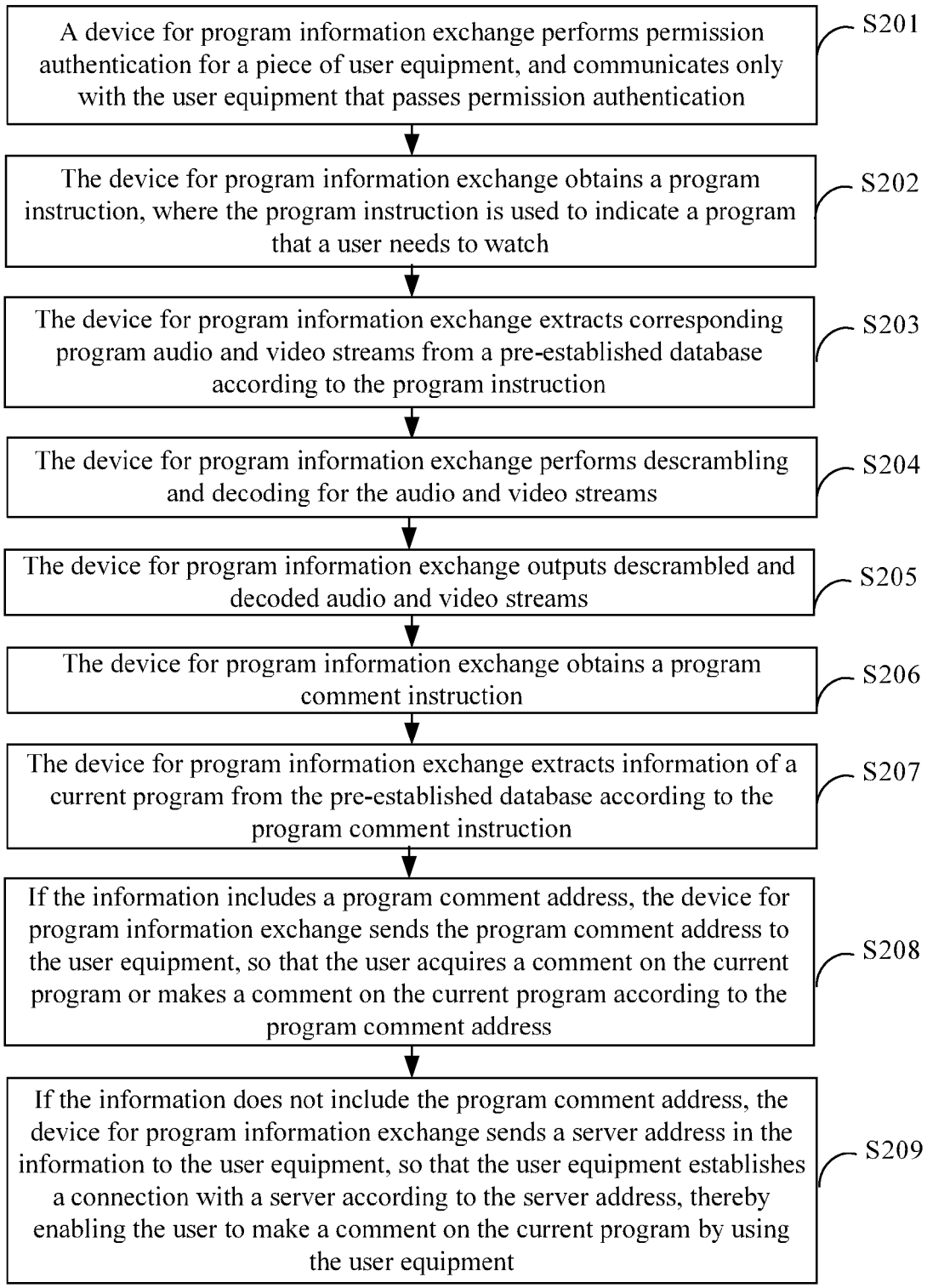
FIG. 2 is a second schematic flowchart of a method for program information exchange according to an embodiment of the present invention.

An embodiment of the present invention provides a method for program information exchange. As shown in FIG. 2, the method includes:

S201: An apparatus for program information exchange performs permission authentication for a user equipment, and communicates only with the user equipment that passes permission authentication.

Exemplarily, the apparatus for program information exchange may perform permission verification for, and establish a connection with, the user equipment when the apparatus is switched on, and then communicate only with the user equipment that passes permission authentication.

It should be noted that in the embodiment of the present invention, it is merely a preferred solution that the apparatus for program information exchange performing permission authentication for the user equipment is set to be the first step of the method for program information exchange. That is, it is a preferred solution that, the apparatus for program information exchange performs permission verification only once for and establishes a connection with the user equipment when switched on. However, the specific implementation manner is not limited thereto. The apparatus for program information exchange may also perform permission verification when the apparatus for program information exchange needs to send information to the user equipment, which is not limited by the embodiment of the present invention.

S202: The apparatus for program information exchange obtains a program instruction, where the program instruction is used to indicate a program that a user needs to watch.

Exemplarily, a manner for the apparatus for program information exchange to obtain the program instruction may be that, the apparatus for program information exchange receives a program instruction which is input by the user by using a control apparatus such as a remote control, where the program instruction is used to indicate which program the user wants to watch.

S203: The apparatus for program information exchange extracts corresponding program audio and video streams from a pre-established database according to the program instruction.

After obtaining the program instruction, the apparatus for program information exchange extracts corresponding program audio and video streams from the pre-established database. It is pointed out in the previous embodiment that, a server packages together program audio and video streams and program-related information, such as a program name, an episode, a comment address, and a server address, and broadcasts the package in a wired or wireless manner. Then, the apparatus for program information exchange may extract corresponding program audio and video streams.

S204: The apparatus for program information exchange performs descrambling and decoding for the audio and video streams.

The server may perform scrambling and encoding for a packaged file when packaging the program audio and video streams and the program-related information. That is, the pre-established database stores program streams formed after the server scrambles and encodes the program information and the program audio and video streams. For example, some programs that need to be paid can be watched only after being descrambled and decoded. Therefore, the apparatus for program information exchange performs descrambling and decoding for the extracted audio and video streams.

S205: The apparatus for program information exchange outputs descrambled and decoded audio and video streams.

After performing descrambling and decoding for the audio and video streams, the apparatus for program information exchange outputs the descrambled and decoded audio and video streams, and specifically, may output to a display apparatus, for example, a television set, so that the user can watch the program through the display apparatus.

S206: The apparatus for program information exchange obtains a program comment instruction.

When the user is watching a television program, if the user wants to make a comment on a current program or wants to know what comments are made by others on the current program, the user can input the program comment instruction by using the control apparatus such as a remote control. For example, a program comment button may be set on the remote control, and the user can send the program comment instruction only by pressing the program comment button, so as to trigger the apparatus for program information exchange to extract information about the current program from the pre-established database.

S207: The apparatus for program information exchange extracts the information about the current program from the pre-established database according to the program comment instruction.

After obtaining the program comment instruction, the apparatus for program information exchange extracts the information about the current program from the pre-established database, where the information may include the program name, episode, comment address, server address, and the like.

S208: If the information includes a program comment address, the apparatus for program information exchange sends the program comment address to the user equipment, so that the user acquires a comment on the current program or makes a comment on the current program according to the program comment address.

After extracting the information about the current program, the apparatus for program information exchange determines whether the information includes the program comment address. If the information includes the program comment address, the apparatus for program information exchange sends the program comment address to the user equipment, for example, sends the program comment address to the user equipment via a wireless router. After receiving the program comment address from the apparatus for program information exchange, the user equipment can connect to a related webpage according to the program comment address. Then, the user using the user equipment may acquire a comment on the current program or make a comment on the current program by using the user equipment.

S209: If the information does not include a program comment address, the apparatus for program information exchange sends a server address in the information to the user equipment, so that the user equipment establishes a connection with a server according to the server address, thereby enabling the user to make a comment on the current program by using the user equipment.

After extracting the information about the current program, the apparatus for program information exchange determines whether the information includes the program comment address. If the information does not include the program comment address, the apparatus for program information exchange sends the server address in the information to the user equipment. Similarly, the server address can be sent to the user equipment via the wireless router. After receiving the server address from the apparatus for program information exchange, the user equipment may connect to the server according to the server address, and the server may create a comment community for the program. Then, the user using the user equipment can make a comment on the current program by using the user equipment. Further, the server stores a newly established program comment address in the information about the program, and stores the information in the pre-established database.

Similarly, in the embodiment of the present invention, step S208 and step S209 may be executed in any sequence. Step S208 describes a case where the information includes a program comment address, and step S209 describes a case where the information does not include a program comment address. Therefore, there is no limitation for time sequence.

In the method for program information exchange provided by the embodiment of the present invention, after a program comment instruction is obtained, information about a current program is extracted from a pre-established database according to the program comment instruction; if the information includes a program comment address, the program comment address is sent to a user equipment, so that a user acquires a comment on the current program or makes a comment on the current program according to the program comment address; or if the information does not include a program comment address, a server address in the information is sent to a user equipment, so that the user equipment establishes a connection with a server according to the server address, thereby enabling the user to make a comment on the current program by using the user equipment. Through the solution, the user can make a comment by using the user equipment on the program currently being watched without adding an external input device.

Figure 3:
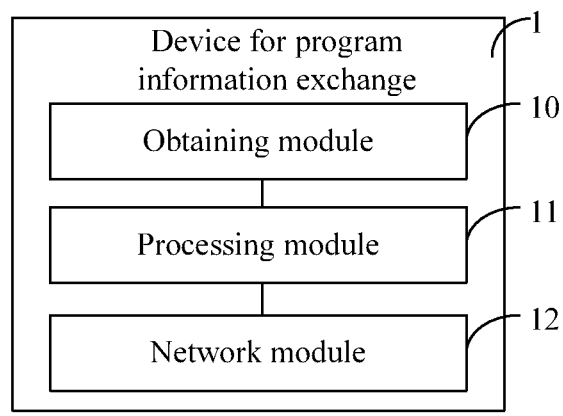
FIG. 3 is a first schematic structural diagram of an apparatus for program information exchange according to an embodiment of the present invention.

An embodiment of the present invention provides an apparatus 1 for program information exchange. As shown in FIG. 3, the apparatus includes a processing module 11, and an obtaining module 10 and a network module 12 which are respectively connected to the processing module 11.

The obtaining module 10 is configured to obtain a program comment instruction.

The processing module 11 is configured to extract information about a current program from a pre-established database according to the program comment instruction, and determine whether the information about the current program includes a program comment address.

The network module 12 is configured to, if the information includes the program comment address, send the program comment address to a user equipment, so that a user acquires a comment on the current program or makes a comment on the current program according to the program comment address, or if the information does not include the program comment address, send a server address in the information to a user equipment, so that the user equipment establishes a connection with a server according to the server address, thereby enabling the user to make a comment on the current program by using the user equipment.

Further, the pre-established database stores program streams formed after the server scrambles and encodes the program information and program audio and video streams.

Figure 4:
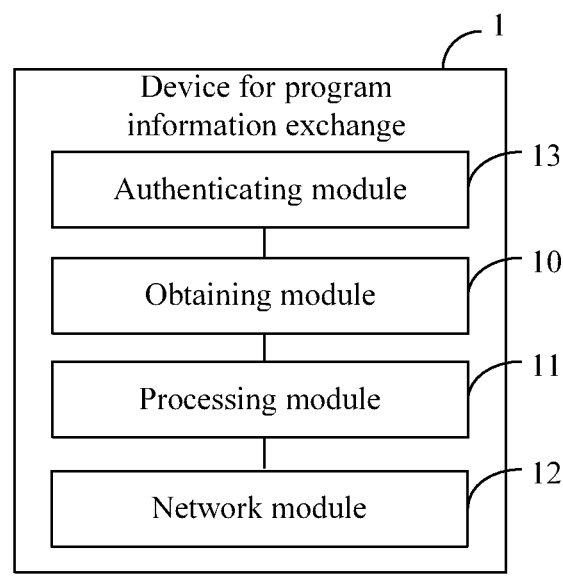
FIG. 4 is a second schematic structural diagram of an apparatus for program information exchange according to an embodiment of the present invention.

Further, as shown in FIG. 4, the apparatus 1 for program information exchange further includes an authenticating module 13 configured to perform permission authentication for the user equipment, and communicate only with the user equipment that passes permission authentication.

The obtaining module 10 is further configured to obtain a program instruction where the program instruction is used to indicate a program that a user needs to watch.

The processing module 11 is further configured to extract corresponding program audio and video streams from the pre-established database according to the program instruction.

Figure 5:
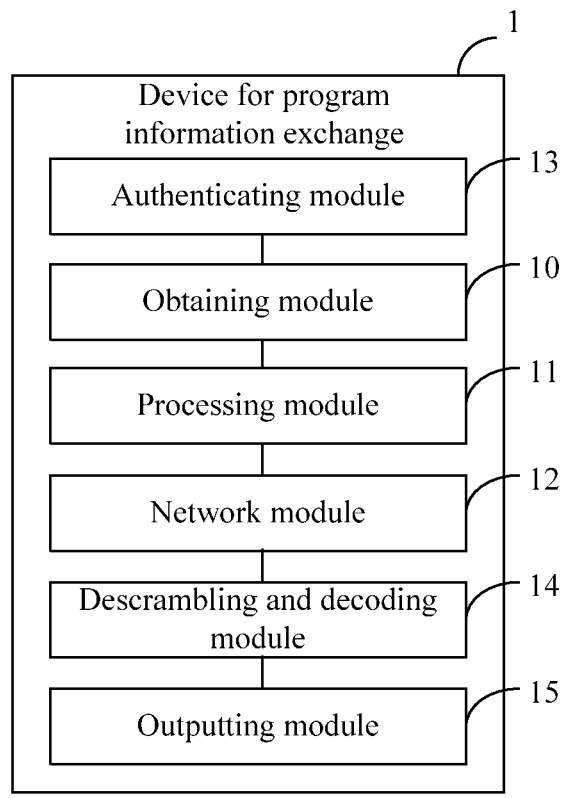
FIG. 5 is a third schematic structural diagram of an apparatus for program information exchange according to an embodiment of the present invention.

As shown in FIG. 5, the apparatus 1 for program information exchange further includes a descrambling and decoding module 14 configured to perform descrambling and decoding for the audio and video streams; and an outputting module 15 configured to output descrambled and decoded audio and video streams.

In the apparatus for program information exchange provided by the embodiment of the present invention, after a program comment instruction is obtained, information about a current program is extracted from a pre-established database according to the program comment instruction; if the information includes a program comment address, the program comment address is sent to a user equipment, so that a user acquires a comment on the current program or makes a comment on the current program according to the program comment address; or if the information does not include a program comment address, a server address in the information is sent to a user equipment, so that the user equipment establishes a connection with a server according to the server address, thereby enabling the user to make a comment on the current program by using the user equipment. With the solution, the user can make a comment by using the user equipment on the program currently being watched without adding an external input device.

Figure 6:
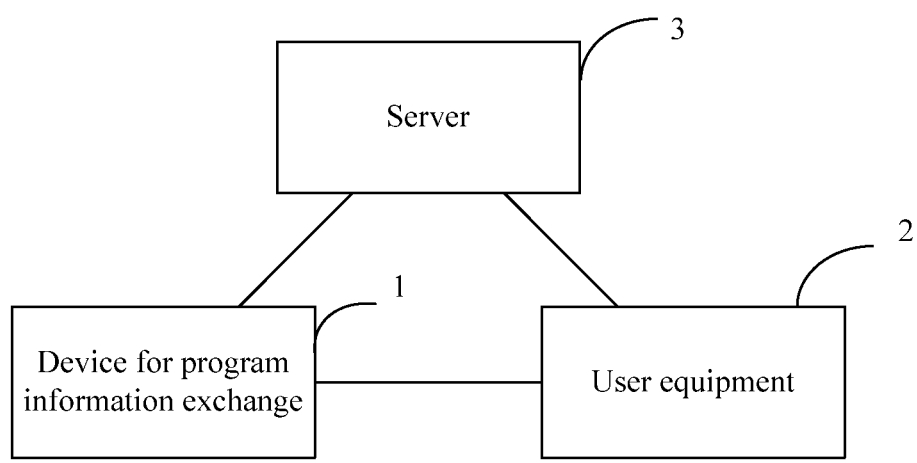
FIG. 6 is a schematic structural diagram of a communications system according to an embodiment of the present invention.

As shown in FIG. 6, a communications system provided by an embodiment of the present invention includes: an apparatus 1 for program information exchange configured to, after obtaining a program comment instruction, extract information about a current program from a pre-established database according to the program comment instruction; if the information includes a program comment address, send the program comment address to a user equipment 2, so that a user acquires a comment on the current program or makes a comment on the current program according to the program comment address; or if the information does not include a program comment address, send a server address in the information to the user equipment 2, so that the user equipment 2 establishes a connection with a server 3 according to the server address, thereby enabling the user to make a comment on the current program by using the user equipment 2; the user equipment 2 configured to receive the program comment address from the apparatus 1 for program information exchange, so that the user acquires a comment on the current program or makes a comment on the current program according to the program comment address, or receive the server address from the apparatus 1 for program information exchange, and establish a connection with the server 3 according to the server address, thereby enabling the user to make a comment on the current program by using the user equipment 2; and the server 3 configured to establish a connection with the user equipment 2, thereby enabling the user to make a comment on the current program by using the user equipment 2.

The apparatus 1 for program information exchange is further configured to perform permission authentication for the user equipment 2, and communicate only with the user equipment 2 that passes permission authentication.

The apparatus 1 for program information exchange is further configured to, after obtaining a program instruction which is used to indicate a program that the user needs to watch, extract corresponding program audio and video streams from the pre-established database according to the program instruction, and perform descrambling and decoding for the audio and video streams, thereby outputting descrambled and decoded audio and video streams.

In the communications system provided by the embodiment of the present invention, after obtaining a program comment instruction, an apparatus for program information exchange extracts information about a current program from a pre-established database according to the program comment instruction; if the information includes a program comment address, the program comment address is sent to a user equipment, so that a user acquires a comment on the current program or makes a comment on the current program according to the program comment address; or if the information does not include a program comment address, a server address in the information is sent to a user equipment, so that the user equipment establishes a connection with a server according to the server address, thereby enabling the user to make a comment on the current program by using the user equipment. With the solution, the user can make a comment by using the user equipment on the program currently being watched without adding an external input device.

It may be clearly understood by a person skilled in the art that, for ease and brevity of description, division of the function modules above is used merely as an example for description. In a practical application, the functions above can be allocated to different function modules for implementation as required. That is, the internal structure of the apparatus is divided into different function modules to implement all or a part of the functions described above. For a detailed working process of the foregoing system, apparatus, and unit, reference may be made to a corresponding process in the foregoing method embodiments, which is not described herein again.

In the several embodiments provided in the present application, it should be understood that the disclosed system, apparatus, and method may be implemented in other manners. For example, the described apparatus embodiment is merely exemplary. For example, the module or unit division is merely logical function division and there may be other division manners in actual implementation. For example, a plurality of units or components may be combined or integrated into another system, or some features may be ignored or not executed. In addition, a displayed or discussed mutual coupling or direct coupling or communication connection may be implemented by means of an indirect coupling or a communications connection of some interfaces, apparatuses, or units, and may be in an electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, function units in the embodiments of the present invention may be integrated into one processing unit, or each of the units may exist alone physically, or two or more units may be integrated into one unit. The foregoing integrated unit may be implemented in a form of hardware, or may be implemented in a form of a software function unit.

If the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer apparatus (which may be a personal computer, a server, a network apparatus, or the like) or a processor to execute all or a part of the steps of the methods described in the embodiments of the present invention. The foregoing storage medium includes any medium that can store program code, such as a Universal Serial Bus (USB) flash drive, a removable hard disk, a Read-Only Memory (ROM), a Random Access Memory (RAM), a magnetic disc, or an optical disc.

The foregoing description is merely specific implementation manners of the present invention, but and is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for program information exchange, comprising:
    obtaining a program comment instruction;
    extracting information about a current program from a pre-established database according to the program comment instruction; and
    sending a program comment address to a user equipment when the information comprises the program comment address, wherein the program comment address is an address for a comment community associated with the current program, and wherein the user equipment uses the program comment address to access comments made by others in the comment community and to add a comment to the comment community; and
    sending a server address to the user equipment when the information does not comprise the program comment address, wherein a server associated with the server address generates the comment community and the program comment address for the comment community when the information does not comprise the program comment address, wherein the server stores the program comment address in the pre-established database after generating the comment community, and wherein the user equipment receives the program comment address from the server after the server generates the comment community.

2. The method for program information exchange according to claim 1, wherein the pre-established database stores program streams formed after the server scrambles and encodes program information and program audio and video streams.

3. The method for program information exchange according to claim 2, wherein before obtaining the program comment instruction, the method further comprises:
    obtaining a program instruction, wherein the program instruction is used to indicate a program that a user needs to watch;
    extracting corresponding program audio and video streams from the pre-established database according to the program instruction;
    performing descrambling and decoding for the program audio and video streams; and
    outputting descrambled and decoded audio and video streams.

4. The method for program information exchange according to claim 2, further comprising communicating only with the user equipment that passes permission authentication.

5. The method for program information exchange according to claim 1, wherein the information comprises the program comment address, and wherein before sending the program comment address to the user equipment, the method further comprises performing permission authentication for the user equipment.

6. The method for program information exchange according to claim 1, wherein before obtaining the program comment instruction, the method further comprises:
    obtaining a program instruction, wherein the program instruction is used to indicate a program that a user needs to watch;
    extracting corresponding program audio and video streams from the pre-established database according to the program instruction;
    performing descrambling and decoding for the program audio and video streams; and
    outputting descrambled and decoded audio and video streams.

7. The method for program information exchange according to claim 1, wherein the program comment instruction is obtained from a program comment button selection on a remote control.

8. An apparatus for program information exchange, comprising:
    a memory comprising a pre-established database:
    a processor coupled to the memory;
    a receiver coupled to the processor and configured to obtain a program comment instruction, wherein the processor is configured to:
        extract information about a current program from the pre-established database according to the program comment instruction; and
        determine whether the information about the current program comprises a program comment address, wherein the program comment address is an address for a comment community associated with the current program; and
    a transmitter coupled to the processor and configured to:
        send the program comment address to a user equipment when the information comprises the program comment address, wherein the user equipment uses the program comment address to access comments made by others in the comment community and to add a comment to the comment community; and
        send a server address to the user equipment when the information does not comprise the program comment address, wherein a server associated with the server address generates the comment community and the program comment address for the comment community when the information does not comprise the program comment address, wherein the server stores the program comment address in the pre-established database after generating the comment community, and wherein the user equipment receives the program comment address from the server after the server generates the comment community.

9. The apparatus for program information exchange according to claim 8, wherein the pre-established database stores program streams formed after the server scrambles and encodes program information and program audio and video streams.

10. The apparatus for program information exchange according to claim 9, wherein the receiver is further configured to obtain a program instruction, wherein the program instruction is used to indicate a program that a user needs to watch, wherein the processor is further configured to:

extract corresponding program audio and video streams from the pre-established database according to the program instruction;
perform descrambling and decoding for the program audio and video streams; and
output descrambled and decoded program audio and video streams.

11. The apparatus for program information exchange according to claim 8, wherein the processor is further configured to:
perform permission authentication for the user equipment; and
communicate only with the user equipment that passes permission authentication.

12. The apparatus for program information exchange according to claim 11, wherein the permission authentication is performed when the apparatus for program information exchange needs to send the information to the user equipment.

13. The apparatus for program information exchange according to claim 8, wherein the receiver is further configured to obtain a program instruction, wherein the program instruction is used to indicate a program that a user needs to watch, wherein the processor is further configured to:
extract corresponding program audio and video streams from the pre-established database according to the program instruction;
perform descrambling and decoding for the program audio and video streams; and
output descrambled and decoded program audio and video streams.

14. The apparatus for program information exchange according to claim 8, wherein the information about the current program in the pre-established database comprises at least one of a program name, an episode, the program comment address, and the server address.

15. A communications system, comprising:
an apparatus for program information exchange comprising:
a processor configured to extract information about a current program from a pre-established database according to a program comment instruction after obtaining the program comment instruction; and
a transmitter coupled to the processor and configured to:
send a program comment address to a user equipment when the information comprises the program comment address, wherein the program comment address is an address for a comment community associated with the current program,
send a server address to the user equipment when the information does not comprise the program comment address, wherein a server associated with the server address generates the comment community and the program comment address for the comment community when the information does not comprise the program comment address, wherein the server stores the program comment address in the pre-established database after generating the comment community, and wherein the user equipment receives the program comment address from the server after the server generates the comment community,
wherein the user equipment comprises a receiver configured to receive at least one of the program comment address and the server address from the apparatus for program information exchange, wherein the user equipment uses the program comment address to access comments made by others in the comment community and to add a comment to the comment community, wherein the user equipment uses the server address to establish a connection between the user equipment and the server associated with the server address;
wherein the server comprises a processor configured to generate the comment community and the program comment address for the comment community when the information does not comprise the program comment address, wherein the server stores the program comment address in the pre-established database after generating the comment community.

16. The communications system according to claim 15, wherein the processor of the apparatus for program information exchange is further configured to perform permission authentication for the user equipment.

17. The communications system according to claim 16, wherein the processor of the apparatus for program information exchange is further configured to communicate only with the user equipment that passes permission authentication.

18. The communications system according to claim 15, wherein the processor of the apparatus for program information exchange is further configured to:
extract corresponding program audio and video streams from the pre-established database according to the program instruction after obtaining a program instruction that is used to indicate a program that the user needs to watch; and
perform descrambling and decoding for the program audio and video streams.

19. The communications system according to claim 18, wherein the processor of the apparatus for program information exchange is further configured to output the descrambled and decoded program audio and video streams.

20. The communications system according to claim 15, wherein the program comment instruction is obtained in response to a selection of a program comment button on a remote control associated with the apparatus for program information exchange.

* * * * *

UNITED STATES PATENT AND TRADEMARK OFFICE
CERTIFICATE OF CORRECTION

PATENT NO. : 9,521,467 B2  
APPLICATION NO. : 14/484795  
DATED : December 13, 2016  
INVENTOR(S) : Li et al.

Page 1 of 1

It is certified that error appears in the above-identified patent and that said Letters Patent is hereby corrected as shown below:

On the Title Page

Page 2, References Cited, item [56], Line 18 Other Publications section should read:

Foreign Communication From A Counterpart Application, European Application No. 13761922.7, Extended European Search Report dated March 18, 2015, 10 pages.

Signed and Sealed this
Twenty-first Day of March, 2017

Michelle K. Lee
*Director of the United States Patent and Trademark Office*